United States Patent [19]
Chronister

[11] Patent Number: 6,121,354
[45] Date of Patent: Sep. 19, 2000

[54] HIGH PERFORMANCE SINGLE-COMPONENT SEALANT

[75] Inventor: Michael Chronister, Norristown, Pa.

[73] Assignee: Bostik, Inc., Huntingdon Valley, Pa.

[21] Appl. No.: 09/196,420

[22] Filed: Nov. 19, 1998

[51] Int. Cl.[7] .................. C08K 5/541; C08K 5/5444; C08L 91/06; C08L 93/04; C08L 53/02

[52] U.S. Cl. ............... 524/262; 524/188; 524/265; 524/266; 524/271; 524/487; 524/489; 524/505; 524/588; 524/590

[58] Field of Search ..................... 524/188, 262, 524/265, 266, 271, 487, 489, 490, 505, 588, 590

[56] References Cited

U.S. PATENT DOCUMENTS

| | | | |
|---|---|---|---|
| 4,539,345 | 9/1985 | Hansen | 524/188 |
| 5,169,890 | 12/1992 | Eadara et al. | 524/271 |
| 5,464,888 | 11/1995 | Owen | 524/588 |

FOREIGN PATENT DOCUMENTS

| | | |
|---|---|---|
| 9715619 | 5/1997 | WIPO . |
| 9748778 | 12/1997 | WIPO . |

*Primary Examiner*—Peter A. Szekely
*Attorney, Agent, or Firm*—Proskauer Rose LLP

[57] ABSTRACT

A high performance, hot melt, single-component sealant which combines the prefered properties of single- and two-component sealants. The sealant comprises a styrene block copolymer, a moisture-curable silylated polyurethane prepolymer, an aromatic tackifier resin, a polar tackifier resin, a polyethylene wax and an organo silane adhesion promoter. Optionally, the sealant may include UV absorbers, antioxidants, plasticizers, catalysts, fillers, pigments, and the like. The sealant does not require mixing before it is applied at a high temperature to the surface that is to be sealed. After application, the sealant forms, upon cooling, a solid elastomer. Upon further exposure to atmospheric moisture, the sealant forms a thermoset crosslinked network having the preferred properties of two-component chemically-cured sealants. The sealant is suitable for use as an edge sealant for insulated glass.

18 Claims, No Drawings

HIGH PERFORMANCE SINGLE-COMPONENT SEALANT

FIELD OF THE INVENTION

The present invention is directed to an improved high performance, hot melt, single-component sealant. The single-component sealant does not require mixing before high temperature application to the surface to be sealed. After application, the sealant forms, upon cooling, a solid elastomer. Upon further exposure to atmospheric moisture, the sealant forms a thermoset crosslinked network having the preferred properties of two-component chemically-cured sealants. The sealant is suitable for use as an edge sealant for insulated glass.

BACKGROUND OF THE INVENTION

Two types of glass sealants are currently used in the insulated glass sealant market. One type is a two-component chemically-cured sealant. These sealants are based on polymers such as polyurethanes, polysulfides, mercaptan-modified polyether polyurethanes, and two-component silicones. The other type is a non-curing single-component sealant which is applied to a surface at high temperatures. These sealants are usually butyl rubber-based.

Two-component sealants generally demonstrate superior performance in fully assembled windows. After application, they cure irreversibly to form solid thermoset elastomeric sealants. As a result of the curing process, two-component sealants exhibit good retention of elastomeric properties at elevated temperatures (above 160° F.) and good elastic recovery. Also, due to their inherent formulation ingredients, two-component sealants exhibit good low temperature flexibility at temperatures as low as −40° F. Two-component sealants are generally formulated with organo silane adhesion promoters which function as coupling agents between the sealant and glass substrates. The resulting chemical bond enables the sealant to withstand water immersion and low temperature exposure. The use of two-component sealants as edge sealants in insulated glass applications requires that the sealant have a low moisture vapor transmission rate to improve the sealant's performance. Two-component polyurethane sealants based on hydroxy-terminated polybutadiene are considered to have the lowest moisture vapor transmission rate.

However, two-component sealants have application limitations and disadvantages related to their two-part nature. In using these sealants, both the ratio of components and their mixing is important and must be precise. If there is any error in the ratio of the components, or if improper mixing occurs, the sealant will not cure properly and/or will not adequately chemically adhere to a substrate. Also, two-component sealants have limited work-life and cure times. Once the components of the sealant are mixed they begin to react to form a thermoset crosslinked structure. The reaction is irreversible and cannot be terminated. This creates problems if the reaction occurs too rapidly while the sealant is being applied or if curing occurs during any equipment shutdowns. During equipment shutdowns, the equipment must be thoroughly purged of mixed sealant or the sealant will cure in the equipment. Purging wastes materials and time, thus adding costs to the final product. Further, if the sealant has not properly cured, it is paste-like and if applied to a window in this form it does not have the mechanical properties to sufficiently hold the window together. Any premature handling or movement of the window causes premature cohesive failure of the sealant, and/or sealant-to-substrate bond delamination. Also, slow curing of the sealant requires that the window manufacturing facilities have staging areas to allow the sealant to properly cure. This lost time and space results in higher costs.

Further disadvantages of two-component sealants are that their use in window manufacture cannot be automated easily since they cure slowly and are only paste-like immediately after application. Also, the moisture-vapor transmission rates of two-component sealants are not sufficient for single-seal window applications. To maintain low moisture vapor transmission through an edge seal, a polyisobutylene rubber secondary seal is generally used making the manufacturing processes more complex, resulting in added costs.

Single-component sealants applied at high temperatures generally have better properties at the point of sealant application, as compared to two-component sealants. Mixing of two-components is not required in using a single-component sealant, therefore there is no waste associated with purged materials as in two-component sealants. Also, staging areas are not required as in slow cure two-component sealants. Further, window units can be handled and moved immediately after manufacture. The window manufacturing process using single-component sealants can be easily automated. Also, current linear extruder application technology requires the use of single-component sealants applied at high temperatures. Most single-component sealants are butyl rubber-based, and thus exhibit an inherent low moisture vapor transmission rate which allows the sealants to be used as a single seal. Windows using a single-edge sealant are less complex to manufacture and require fewer materials, resulting in reduced costs.

However, single-component, hot melt edge sealants have disadvantages related to lower performance properties. They are non-curing, and thus do not perform well under high temperature static loads. Their solid elastomeric properties at room temperature always can revert back to a liquid state upon heating. Also, they are generally rubber-based and do not chemically adhere to glass substrates which creates various problems. In order to develop the mechanical bond between a single component sealant and a glass substrate, tensile properties are reduced. Butyl based sealants need to quickly yield in tension in order to maintain their bond to glass. High tensile strength sealants would pull themselves off the glass. Due to this quick yielding property requirement, hot melt single-component sealants often have poor elastic recovery and static load resistance. Also, single-component sealants do not cure and do not chemically bond to glass, so that the mechanical bond can be adversely affected by low temperatures and water at the bond interface. Further, many butyl rubber-based sealants have poor low temperature flexibility further limiting their use in low temperature climates.

International Patent Application, Publication No. WO 97/15619 discloses a one-component, hot-applied, chemically-curing edge sealant for insulating glass units. The sealant contains a thermoplastic hot melt resin and an atmospheric curing resin of the type which polymerizes upon exposure to an ambient atmosphere. The atmospheric curing resin is combined with the thermoplastic hot melt resin as a single material. The sealant is described as comprising 10–90% by weight of a thermoplastic hot melt resin comprising a solid chlorinated paraffin and 5–50% by weight of an atmospheric curing resin such as a silane-terminated polyurethane.

SUMMARY OF THE INVENTION

This invention is directed to high performance, hot melt, single-component sealants comprising a styrene block copolymer, a moisture-curable silylated polyurethane prepolymer, an aromatic tackifier resin, a polar tackifier resin, a polyethylene wax, and an organo silane adhesion promoter. The sealant combines the advantages of both single- and two-component sealants in that it performs as a hot melt single-component sealant during application and additionally has the overall performance properties of two-component sealants.

The hot melt, single-component sealant of this invention has advantages as compared to existing single-and two-component sealants. The single-component sealant does not require two-component mixing before high temperature application as in two-component sealants. Purging of equipment is not required as in two-component sealants. The single-component sealant is applied using current hot melt pumps and linear extruders at temperatures from about 140° to 250° F. After application, the sealant cools forming a solid elastomer, and upon further exposure to atmospheric moisture forms a thermoset crosslinked network having the performance properties of a two-component sealant.

The sealant of this invention has the following good properties: mechanical adhesion to substrates initially, chemical adhesion to substrates after, curing, static load resistance, elastic recovery, hardness, tensile modulus, and low temperature flexibility. In addition, the sealant has a very good low moisture vapor transmission rate which allows it to function as a single seal.

The sealant is preferably used as an edge sealant in an insulating glass unit having a first glazing pane maintained in a spaced relation with a second glazing pane by a spacer.

DETAILED DESCRIPTION OF THE INVENTION

The present invention is directed to a high performance, hot melt, single-component sealant. The sealant comprises a styrene block copolymer, a moisture-curable silylated polyurethane prepolymer, an aromatic tackifier resin, a polar tackifier resin, a polyethylene wax, and an organo functional silane. Optionally, the sealant may include UV absorbers, antioxidants, plasticizers, catalysts, fillers, pigments, and the like.

The styrene block copolymer is present in the sealant in amounts of from about 4% to about 16%, preferably from about 6% to about 10%, and most preferably, from about 7% to about 9%, by weight. The moisture-curable silylated polyurethane prepolymer is present in the sealant in amounts of from about 5% to about 20%, preferably, from about 9% to about 16%, and most preferably from about 12% to about 14%, by weight. The aromatic tackifier resin is present in the sealant in amounts of from about 4% to about 14%, preferably, from about 7% to about 9%, by weight. The polar tackifier resin is present in the sealant in amounts of from about 4% to about 10%, preferably, from about 5% to about 7% by weight. The polyethylene is present in the sealant in amounts of from about 1% to about 6%, preferably, from about 3% to about 4%, by weight. The organo functional silane is present in the sealant in amounts of from about 0.2% to about 1%, preferably, from about 0.4% to about 0.5%, by weight.

The styrene block copolymer component of the sealant includes a styrene-butadiene-styrene block copolymer, a styrene-isoprene-styrene block copolymer, or mixtures thereof. The styrene block copolymer may be silylated. A preferred styrene block copolymer comprises a styrene-butadiene-styrene block copolymer. (SBS block copolymer). The SBS block copolymer is a solid elastomer at room temperature. After applying the sealant to a surface at high temperatures and then cooling, the sealant has elastic recovery and static load resistance due to the SBS block copolymer contained therein. At application temperatures, the styrene block end groups of the SBS block copolymer melt, which allows the sealant to flow during application. In addition, at melt conditions, the SBS block copolymer provides melt viscosity and sag resistance to the sealant at higher application temperatures. The SBS block copolymer is compatible with other sealant components, particularly with the silylated polyurethane prepolymer. Also, the SBS block copolymer provides low moisture vapor transmission rates to the sealant Suitable commercially available SBS block copolymers include Kraton™ and Kraton D1102™ (which are available from Shell), Vector™ and Vector 8508™ (which are available from Dexco), and Stereon™ (which is available from Firestone).

The moisture-curable silylated polyurethane prepolymer component of the sealant comprises the reaction product of: a) a polybutadiene polyol, b) a high molecular weight monofunctional alcohol, c) a diisocyanate, and d) an organo functional silane.

The polybutadiene polyol component of the prepolymer provides the advantage of a low moisture transmission rate. The polybutadiene polyol comprises hydroxy-terminated polybutadiene. A suitable commercially available example would be Poly bd R45HT from Elf-Atochem.

The high molecular weight monofunctional alcohol component of the prepolymer reduces the crosslink density of the prepolymer which results in a lower cured tensile modulus and better adhesion of the sealant to glass. The high molecular weight monofunctional alcohol comprises stearyl alcohol.

The diisocyanate component of the prepolymer is difunctional and provides selective reactivity resulting in stable prepolymers having lower viscosity,. The diisocyanate has good resistance to ultraviolet light. The diisocyanates include hexamethylene diisocyanate and adducts thereof, isophorone diisocyanate and adducts thereof, methylene bis (4-cyclohexyl isocyanate), tetramethylxylene diisocyanate, toluene diisocyanate, 4,4' methylene diphenyl diisocyanate and blends of 2,4' methylene diphenyl diisocyanate and 4,4' methylene diphenyl diisocyanate, and mixtures thereof. The preferred diisocyanate is isophorone diisocyanate. An organo functional silane may be used to end-cap free isocyanate groups remaining as a result of a polyurethane reaction.

The organo functional silane component of the prepolymer includes phenyl amino propyl trimethoxy silane, methyl amino propyl trimethoxy silane, n-butyl amino propyl trimethoxy silane, t-butyl amino propyl trimethoxy silane, cyclohexyl amino propyl trimethoxy silane, dibutyl maleate amino propyl trimethoxy silane, dibutyl maleate substituted-4-amino 3,3-dimethyl butyl trimethoxy silane, amino propyl triethoxy silane, and mixtures thereof. The preferred organo functional silane is phenyl amino propyl trimethyoxy silane, commercially available as Silquest Y-9669 from Witco.

The ratio of isocyanate groups in the diisocyanate to hydroxy groups in the hydroxy-terminated polybutadiene polyol (NCO/OH) in the prepolymer is from about 1.5 to about 2.2.

The silylated polyurethane prepolymer reduces the melt viscosity of the sealant which aids in wetting of substrates. When the sealant cools after being applied at high temperature, the prepolymer functions as a plasticizer, reducing the tensile modulus and strength of the SBS block copolymer. Upon exposure to atmospheric moisture, the prepolymer no longer functions as a plasticizer, but rather forms a three dimensional crosslinked network with itself. This network provides the sealant with elastic recovery and high temperature dead load resistance. Also, the prepolymer provides reactive sights for the adhesion promoter to form chemical covalent crosslinks to the glass substrate.

The aromatic tackifier resin component of the sealant has a low softening temperature, is compatible with the styrene block copolymer, and modifies its solid and flow properties. At melt application, the aromatic tackifier resin reduces the melting point and melt viscosity of the sealant, and wets the substrates. At room temperature, the aromatic tackifier resin provides the sealant with toughness and static load resistance. The aromatic tackifier resins include $C_9$-aromatic hydrocarbon resins (Norsolene S™ which is available from Sartomer), $C_5$ modified $C_9$-aromatic resins (Norsolene A™ which is available from Sartomer), $C_9$-modified $C_5$ resins (Hercotac™ which is available from Hercules), and mixtures thereof. The preferred aromatic tackifier resin is a $C_9$-aromatic hydrocarbon resin with a softening temperature of about 85° C.

The polar tackifier resin component of the sealant provides strong mechanical adhesion of the sealant to the substrate by polar associations. This mechanical bond allows the sealant to properly adhere to substrates prior to and during the period the prepolymer is crosslinking and developing chemical bonds to the substrate. The polar tackifier resin may be end-block or mid-block compatible. The polar tackifier resins include terpene phenolic resins (Nirez™ which is available from Arizona Chemical), polymerized rosin (Sylvatac™ which is available from Arizona Chemical), rosin esters (Unitac™ which is available from Union Camp), terpene resins (Piccolyte A™ which is available from Hercules and Zonarez™ which is available from Arizona), modified terpene resins (Piccolyte HM™ which is available from Hercules), hydrogenated $C_9$-resins (Regalite S™ which is available from Hercules), and mixtures thereof. The preferred polar tackifier resin is a terpene-phenolic resin.

The polyethylene wax component of the sealant reduces melt viscosity at melt conditions of the sealant and improves wetting of the substrate. At room temperature, the polyethylene wax improves toughness and static load resistance of the sealant. The polar functionality of the polyethylene wax improves mechanical bonding to the glass substrate when the prepolymer is curing. The polyethylene waxes include a maleic anhydride grafted polyethylene with a molecular weight about 700g/mol and an isopropyl maleate grafted polyethylene (Petrolite B702™ which is available from Baker Petrolite).

The organo functional silane component of the sealant provides covalent crosslinking bonds between the sealant and the substrate. The organo functional silanes include glycidoxy propyl trimethoxy silane, amino propyl trimethoxy silane, amino propyl triethoxy silane, N-phenyl amino propyl trimethoxy silane, bis-(trimethoxy silyl propyl) amine, N-beta-(aminoethyl)-amino propyl trimethoxy silane, N-beta-(aminoethyl)-amino propyl methyl dimethoxy silane, ureido propyl trimethoxy silane, tris[3-(trimethoxysilyl) propyl] isocyanurate, and mixtures thereof. The preferred organo functional silane is glycidoxy propyl trimethoxy silane.

The processes for producing the polyurethane prepolymer comprise adding an hydroxy-terminated polybutadiene, alcohol and an antioxidant to a clean mixing device; heating the contents of the mixing device under vacuum to a temperature greater than about 150° F. to melt the alcohol and to remove any residual water; slowly adding a diisocyanate to the mixing device until the mixture is uniform; adding a catalyst, such as dibutyl tin dilaurate, to the uniform mixture; heating the mixture under vacuum to a temperature of from about 145° to about 155° F. for about 120 minutes; adding an organo functional silane to the mixture; and then heating the mixture under vacuum to a temperature of from about 140° to about 160° F. for about 90 minutes.

The processes for producing the sealant comprise adding the styrene block copolymer, aromatic tackifier resin, polar tackifier resin, plasticizers, filler, antioxidants, and pigments to a clean mixing device. The raw materials can be at room temperature during their addition to the mix. The ingredients are mixed under vacuum while being heated to temperatures of 280–295F. During this temperature rise, the solid thermoplastic raw materials melt and become the liquid carrier for the rest of the solid raw materials. The mixture is maintained under vacuum at this temperature until all the ingredients are melted and uniformly blended. This takes approximately 1 to 2 hours. Once the mixture is uniform, the temperature of the mix is reduced at 230–250F. When the mixture is between 230–250F., the wax, desiccant, silylated polyurethane prepolymer are added and mixed under vacuum at temperatures of 220–240F. until uniform. This step takes approximately 1–1½ hours. The prepolymer is added hot (140–165F.) to aid its flow. Finally, the organo silane and catalyst are added at temperatures between 225–235F. and mixed under vacuum for 5–10 minutes until uniform.

The sealant is applied to a substrate by hot melt pumps and linear extruders at temperatures of from about 140° to about 250° F.

The invention is further illustrated by the following examples:

EXAMPLE 1

A prepolymer was prepared from the following materials: a hydroxy-terminated polybutadiene (Poly bd R45HT™ which is available from Elf-Atochem North America), stearyl alcohol, an antioxidant (a hindered phenol antioxidant, Irganox 1010), isophorone diisocyanate (IPDI), a dibutyl tin dilaurate catalyst and phenyl amino propyl trimethoxy silane. The ratio of NCO/OH was 1.9. (This is the ratio of isocyanate groups in the diisocyanate to hydroxy groups in the hydroxy-terminated polybutadiene). The stearyl alcohol was added in an amount which reacted with 50% of the unreacted isocyanate groups on the polybutadiene/IPDI prepolymer. The phenyl amino propyl trimethoxy was added in an amount which reacted with the remaining 50% of the unreacted isocyanate groups on the polybutadiene/IPDI prepolymer. These materials, their amounts and the process of preparing the prepolymer are as follows:

| | |
|---|---|
| Hydroxy-terminated polybutadiene (Poly bd R45HT from Elf-Atochem) | 71.88% by weight |
| Stearyl alcohol (Lanette 18 from Henkel) | 7.55% by weight |
| Antioxidant (Irganox 1010 from CIBA) | 1.01% by weight |
| Isophorone diisocyanate Vestanat IPDI from Creanova) | 12.58% by weight |

-continued

| | |
|---|---|
| Dibutyl tin dilaurate (Methacure T-12 from Air Products) | 0.05% by weight |
| Phenyl amino propyl trimethoxy silane (Silquest Y-9669 from Witco) | 6.94% by weight |

The hydroxy-terminated polybutadiene, stearyl alcohol, and antioxidant were added to a mixing device and heated under vacuum to a temperature greater than 150° F. to melt the stearyl alcohol and remove any residual water. Isophorone diisocyanate was slowly added to the mixing device until the mixture was uniform. Dibutyl tin dilaurate catalyst was added to the mixing device and the contents mixed under vacuum for about 120 minutes at a temperature of between about 145° and about 155° F. Phenyl amino propyl trimethoxy silane was added to the mixing device and the contents mixed under vacuum for about 90 minutes at a temperature of between about 140° and about 160° F.

The prepolymer produced had a final viscosity of 48,000 cps at 145° F. At room temperature, the prepolymer was a thick liquid with a viscosity greater than 700,000 cps.

EXAMPLE 2

The process of Example 1 was repeated to prepare prepolymers using different amounts of stearyl alcohol. The materials used were the same as in Example 1. The materials used, their amounts, and the NCO/OH ratio are set forth in Formulations A to C as follows:

| A | |
|---|---|
| Hydroxy-terminated polybutadiene | 71.91% by weight |
| Stearyl alcohol (end caps 35% of unreacted NCO) | 5.03% by weight |
| Antioxidant | 1.01% by weight |
| Isophorone diisocyanate | 12.58% by weight |
| Dibutyl tin dilaurate | 0.04% by weight |
| Phenyl amino propyl trimethoxy silane (end caps 65% of unreacted NCO) | 9.42% by weight |
| NCO/OH | 1.9 by weight |

| B | |
|---|---|
| Hydroxy-terminated polybutadiene | 71.86% by weight |
| Stearyl alcohol (end caps 69% of unreacted NCO) | 10.06% by weight |
| Antioxidant | 1.00% by weight |
| Isophorone diisocyanate | 12.58% by weight |
| Dibutyl tin dilaurate | 0.04% by weight |
| Phenyl amino propyl trimethoxy silane (end caps 31% of unreacted NCO) | 4.46% by weight |
| NCO/OH | 1.9 |

| C | |
|---|---|
| Hydroxy-terminated polybutadiene | 74.07% by weight |
| Stearyl alcohol (end caps 0% of unreacted NCO) | — by weight |
| Antioxidant | 0.98% by weight |
| Isophorone diisocyanate | 12.30% by weight |
| Dibutyl tin dilaurate | 0.05% by weight |
| Phenyl amino propyl trimethoxy silane (end caps 100% of unreacted NCO) | 12.60% by weight |
| NCO/OH | 1.8 |

EXAMPLE 3

The procedure of Example 1 was repeated to prepare prepolymers with different types of end capping. The monofunctional alcohol used in Formulations A and B was based on low molecular weight polyethylene with an OH equivalent weight of 435 (Unilin 350™ which is available from Baker-Petrolite). The materials used are the same as in Example 1 unless otherwise described. The materials used, their amounts and the NCO/OH ratio are as set forth in Formulations A to D as follows:

| A | |
|---|---|
| Hydroxy-terminated polybutadiene | 68.68% by weight |
| Monofunctional alcohol (end caps 50% of unreacted NCO) (Unilin 350 from Baker-Petrolite) | 11.68% by weight |
| Antioxidant | 0.96% by weight |
| Isophorone diisocyanate | 12.02% by weight |
| Dibutyl tin dilaurate | 0.04% by weight |
| Phenyl amino propyl trimethoxy silane (end caps 50% of unreacted NCO) | 6.63% by weight |
| NCO/OH | 1.9 |

The prepolymer prepared was a paste-like wax at room temperature. The prepolymer had a melt viscosity of 160,000 cps at 145° F.

| B | |
|---|---|
| Hydroxy-terminated polybutadiene | 67.63% by weight |
| Monofunctional alcohol (end caps 70% of unreacted NCO) | 15.28% by weight |
| Antioxidant | 1.02% by weight |
| Isophorone diisocyanate | 11.83% by weight |
| Dibutyl tin dilaurate | 0.05% by weight |
| Phenyl amino propyl trimethoxy silane (end caps 30% of unreacted NCO) | 4.19% by weight |
| NCO/OH | 1.9 |

The prepolymer prepared was a solid wax at room temperature. Melt viscosity was 208,000 cps at 140° F.

| C | |
|---|---|
| Hydroxy-terminated polybutadiene | 72.29% by weight |
| Stearyl alcohol (end caps 50% of unreacted NCO) | 7.59% by weight |
| Antioxidant | 1.00% by weight |
| Isophorone diisocyanate | 12.65% by weight |
| Dibutyl tin dilaurate | 0.05% by weight |
| T-butyl amino propyl trimethoxy silane[1] (end caps 50% of unreacted NCO) | 6.42% by weight |
| NCO/OH | 1.9 |

[1](PSX 5403 ™ which is available from Sivinto)

| D | |
|---|---|
| Hydroxy-terminated polybutadiene | 72.63% by weight |
| Stearyl alcohol (end caps 50% of unreacted NCO) | 7.63% by weight |
| Antioxidant | 1.01% by weight |
| Isophorone diisocyanate | 12.71% by weight |
| Dibutyl tin dilaurate | 0.05% by weight |
| Phenyl amino propyl trimethoxy silane (end caps 25% of unreacted NCO) | 3.51% by weight |
| Amino propyl trimethoxy silane[1] (end caps 25% of unreacted NCO) | 2.46% by weight |
| NCO/OH | 1.9 |

[1](Silquest A-1110 ™ which is available from Witco)

EXAMPLE 4

The procedure of Example 1 was repeated to prepare a prepolymer. The hydroxy-terminated polybutadiene (Poly bd R45HT™ which is available from Elf-Atochem North America) used has a lower functionality than the hydroxy-terminated polybutadiene used in Examples 1 to 3. The other materials used were the same as in Example 1. The materials used, their amounts and the NCO/OH ratios are set forth as follows:

| | |
|---|---|
| Hydroxy-terminated polybutadiene | 79.04% by weight |
| Stearyl alcohol (end caps 50% of unreacted NCO) | 4.91% by weight |
| Antioxidant | 1.03% by weight |
| Isophorone diisocyanate | 10.31% by weight |
| Dibutyl tin dilaurate | 0.05% by weight |
| Phenyl amino propyl trimethoxy silane (end caps 50% of unreacted NCO) | 4.66% by weight |
| NCO/OH | 1.61 |

EXAMPLE 5

The procedure of Example 1 was repeated to prepare a prepolymer. The diisocyanate used was a blend of 2,4'-methylene diphenyl diisocyanate and 4,4'-methylene diphenyl diisocyanate (Mondur ML™ which is available from Bayer). The other materials used were the same as in Example 1. The materials used, their amounts and the NCO/OH ratio are set forth as follows:

| | |
|---|---|
| Hydroxy-terminated polybutadiene | 72.62% by weight |
| Stearyl alcohol (end caps 50% of unreacted NCO) | 9.80% by weight |
| Antioxidant | 1.02% by weight |
| Methylene diphenyl disolyanate (Mondur ML from Bayer) | 16.56% by weight |
| NCO/OH | 2.2 |

The prepolymer prepared was not silylated, but remained as an isocyanate reactive prepolymer. The prepolymer was a solid wax at room temperature with a melt viscosity of 480,000 cps at 130° F.

EXAMPLE 6

The procedure of Example 1 was repeated to prepare a prepolymer. The materials used were the same as in Example 1. The materials used and their amounts are set forth as follows:

| | |
|---|---|
| Hydroxy-terminated polybutadiene | 71.81% by weight |
| Stearyl alcohol | 7.54% by weight |
| Antioxidant | 1.00% by weight |
| Isophorone diisocyanate | 12.67% by weight |
| Dibutyl tin dilaurate | 0.04% by weight |
| Phenyl amino propyl trimethoxy silane | 6.94% by weight |

EXAMPLE 7

The following formulation was used to prepare an edge sealant:

| | |
|---|---|
| Plasticizer (Hydrobrite 550 from Witco) | 7.79% by weight |
| Antioxidant (Iraganox 1010 from Ciba) | 0.31% by weight |
| Aromatic tackifier resin (Norsolene S-85 from Sartomer) | 7.79% by weight |
| Polybutadiene rubber (Diene 35 AC10 from Firestone) | 0.88% by weight |
| CaCO$_3$ (Camel Wite ST from ECC) | 46.77% by weight |
| Terpene phenolic resin (Nirez 300 from Arizona) | 4.84% by weight |
| Aromatic modified terpene resin (Piccolyte HM106 from Hercules) | 2.93% by weight |
| SBS block copolymer (Vector 8508 from Dexco) | 7.79% by weight |
| TiO$_2$ pigment (Kronos 2101 from Kronos) | 2.19% by weight |
| Carbon Black (Printex U from Degussa) | 0.04% by weight |
| Isopropyl maleate grafted polyethylene wax (Petrolite B702 from Baker-Petrolite) | 3.91% by weight |
| Desiccant (Para-Toluene Sulfonyl Isocyanate from Vanchem) | 0.59% by weight |
| Prepolymer of Example 6 | 13.63% by weight |
| Silane adhesion promoter (Silane A-187 from Witco) | 0.45% by weight |
| Dibutyl tin dilaurate (Metacure T-12 from Air Products) | 0.07% by weight |

The processes for producing the sealant comprise adding the plasticizer, antioxidant, aromatic tackifier resin, polybutadiene rubber, CaCO$_3$, terpene phenolic resin, aromatic modified terpene resin, SBS block copolymer TiO$_2$, and carbon black to a clean mixing device. The raw materials can be at room temperature during their addition to the mix. The ingredients are mixed under vacuum while being heated to temperatures of 280–295F. During this temperature rise, the solid thermoplastic raw materials melt and become the liquid carrier for the rest of the solid raw materials. The mixture is maintained under vacuum at this temperature until all the ingredients are melted and uniformly blended. This takes approximately 1 to 2 hours. Once the mixture is uniform, the temperature of the mix is reduced at 230–250F. When the mixture is between 230–250F., the polyethylene wax, desiccant, silylated polyurethane prepolymer are added and mixed under vacuum at temperatures of 220–240F. until uniform. This step takes approximately 1–1½ hours. The prepolymer is added hot (140–165F.) to aid its flow. Finally, the silane adhesion promotor and dibutyl tin dilaurate are added at temperatures between 225–235F. and mixed under vacuum for 5–10 minutes until uniform.

The sealant was a solid elastomer at room temperature with an initial Shore A hardness of 20. The sealant had a melt flow index of 55 g/10 min at 160° F. After exposure to atmospheric moisture, the final cured tensile properties were as follows: 25% modulus was 67 psi, 100% modulus was 108 psi, tensile strength was 149 psi, and elongation at break was 350%. Final cured Shore A hardness was 53. The sealant passed a 1 inch mandrel bend test below −25° F. The uncured and cured sealants exhibited 100% cohesive failure to glass, anodized aluminum, and tin-plated steel. Anodized aluminum and tin-plated steel are two of the most common spacer materials for insulated glass.

The sealant produced was packaged in hermetically sealed cartridges, pails, or drums.

EXAMPLE 8

The following formulation was used to prepare an edge sealant by the procedure and with the raw materials as set forth in Example 7:

| | |
|---|---|
| Plasticizer | 7.86% by weight |
| Antioxidant | 0.31% by weight |
| Aromatic resin | 7.86% by weight |
| Terpene phenolic resin | 7.86% by weight |
| CaCO$_3$ filler | 49.20% by weight |
| Carbon Black | 0.25% by weight |
| SBS block copolymer | 7.86% by weight |
| Isopropyl maleate grafted polyethylene wax | 3.93% by weight |
| Desiccant | 0.59% by weight |
| Prepolymer of Example 6 | 13.76% by weight |
| Silane adhesion promoter | 0.45% by weight |
| Dibutyl tin dilaurate | 0.07% by weight |

The sealant produced was a solid elastomer at room temperature with an initial Shore A hardness of between 30 to 40. The sealant had a melt flow index of 60 g/10 min at 160° F. The moisture vapor transmission rate was 1.7 g/m$^2$/day (permeance was 0.02 g/m$^2$/mmHG/24hrs). After exposure to atmospheric moisture the sealant had a Shore A hardness of 55. The uncured and the cured sealants exhibited 100% cohesive failure to glass, anodized aluminum, and tin-plated steel.

EXAMPLE 9

The following formulation was used to prepare an edge sealant by the procedure and with the raw material as set forth in Example 7:

| | |
|---|---|
| Plasticizer | 4.53% by weight |
| Antioxidant | 0.28% by weight |
| Aromatic tackifier resin | 11.25% by weight |
| Terpene phenolic resin | 7.50% by weight |
| CaCO$_3$ filler | 46.86% by weight |
| Carbon Black | 0.16% by weight |
| SBS block copolymer | 7.50% by weight |
| Isopropyl maleate grafted polyethylene wax | 5.62% by weight |
| Desiccant | 0.56% by weight |
| Prepolymer of Example 2A | 15.00% by weight |
| Silane adhesion promoter | 0.67% by weight |
| Dibutyl tin dilaurate | 0.07% by weight |

The sealant produced was a solid elastomer at room temperature. After exposure to atmospheric moisture, the sealant had a Shore A Hardness of 68, 25% tensile modulus of 147 psi, 100% tensile modulus of 223 psi, tensile strength of 290 psi, elongation at break of 220%. The uncured and cured sealants exhibited 100% cohesive failure to glass. This adhesive bond exhibited 100% cohesive failure after 7 days immersion in 140° F. water.

EXAMPLE 10

The following formulation was used to prepare an edge sealant by the procedure and with the raw-material as set forth in Example 7:

| | |
|---|---|
| Plasticizer | 6.68% by weight |
| Antioxidant | 0.23% by weight |
| Aromatic tackifier resin | 9.77% by weight |
| Terpene phenolic resin | 7.81% by weight |
| CaCO$_3$ filler | 48.82% by weight |
| Carbon Black | 0.16% by weight |
| SBS block copolymer | 7.81% by weight |
| Isopropyl maleate grafted polyethylene wax | 1.95% by weight |
| Desiccant | 0.59% by weight |
| Prepolymer of Example 2A | 15.63% by weight |
| Silane adhesion promoter | 0.47% by weight |
| Dibutyl tin dilaurate | 0.08% by weight |

While the invention has been described by reference to specific examples, this was for purposes of illustration. Numerous alternatives will be apparent to those skilled in the art, and are considered to be within the scope of the invention.

What is claimed is:

1. A hot melt, single-component sealant comprising:
   a) a styrene block copolymer,
   b) a moisture-curable silylated polyurethane prepolymer,
   c) an aromatic tackifier resin,
   d) a polar tackifier resin,
   e) a polyethylene wax, and
   f) an organo functional silane.

2. The sealant of claim 1 comprising:
   a) 4 to 16% by weight of the styrene block copolymer,
   b) 5 to 20% by weight of the moisture-curable silylated polyurethane prepolymer,
   c) 4 to 14% by weight of the aromatic tackifier resin,
   d) 4 to 10% by weight of the polar tackifier resin,
   e) 1 to 6% by weight of the polyethylene wax, and
   f) 0.2 to 1% by weight of the organo functional silane.

3. The sealant of claim 1, wherein the styrene block copolymer comprises a styrene-butadiene-styrene block copolymer, a styrene-isoprene-styrene block copolymer, or mixtures thereof.

4. The sealant of claim 3, wherein the styrene block copolymer comprises a styrene-butadiene-styrene block copolymer.

5. The sealant of claim 1, wherein the styrene block copolymer is silylated.

6. The sealant of claim 1, wherein the moisture-curable silylated polyurethane prepolymer comprises the reaction product of:
   (a) a polybutadiene polyol,
   (b) a monofunctional alcohol having a carbon chain length of at least 18 carbon atoms,
   (c) a diisocyanate, and
   (d) an organo functional silane.

7. The sealant of claim 6, wherein the polybutadiene polyol comprises hydroxy-terminated polybutadiene.

8. The sealant of claim 6, wherein the high molecular weight monofunctional alcohol comprises stearyl alcohol.

9. The sealant of claim 6, wherein the diisocyanate comprises isophorone diisocyanate, hexamethylene diisocyanate, methylene bis (4-cyclohexyl isocyanate), tetramethylxylene diisocyanate, toluene diisocyanate, 4,4'-methylene diphenyl diisocyanate, blends of 2,4'-methylene diphenyl diisocyanate and 4,4'-methylene diphenyl diisocyanate, or mixtures thereof.

10. The sealant of claim 9, wherein the diisocyanate comprises isophorone diisocyanate.

11. The sealant of claim 6, wherein the organo functional silane comprises phenyl amino propyl trimethoxy silane, methyl amino propyl trimethoxy silane, n-butyl amino propyl trimethoxy silane, t-butyl amino propyl trimethoxy silane, cyclohexyl amino propyl trimethoxy silane, dibutyl maleate amino propyl trimethoxy silane, dibutyl maleate substituted-4-amino, 3,3-dimethyl butyl trimethoxy silane, amino propyl triethoxy silane, or mixtures thereof.

12. The sealant of claim 1, wherein the aromatic tackifier resin comprises a $C_9$-aromatic hydrocarbon resin, a $C_5$ modified $C_9$-aromatic resin, a $C_9$-modified $C_5$ resin, or mixtures thereof.

13. The sealant of claim 12, wherein the aromatic tackifier resin comprises a $C_9$-aromatic hydrocarbon resin with a softening temperature of about 85° C.

14. The sealant of claim 1, wherein the polar tackifier comprises a terpene phenolic resin, a polymerized rosin, a rosin ester, a terpene resin, a modified terpene resin, a hydrogenated $C_9$-resin, or mixtures thereof.

15. The sealant of claim 14, wherein the polar tackifier comprises a terpene-phenolic resin.

16. The sealant composition of claim 1, wherein the polyethylene wax comprises a maleic anhydride grafted polyethylene, an isopropyl maleate grafted polyethylene, or mixtures thereof.

17. The sealant of claim 1, wherein the organo functional silane comprises glycidoxy propyl trimethoxy silane, amino propyl trimethoxy silane, amino propyl triethoxy silane, N-phenyl amino propyl trimethoxy silane, bis-(trimethoxy silyl propyl) amine, N-beta-(aminoethyl)-amino propyl trimethoxy silane, N-beta-(aminoethyl)-amino propyl methyl dimethoxy silane, ureido propyl trimethoxy silane, tris[3-(trimethoxysilyl) propyl] isocyanurate, or mixtures thereof.

18. The sealant of claim 17, wherein the organo functional silane comprises glycidoxy propyl trimethoxy silane.

* * * * *